United States Patent [19]

Pilkington et al.

[11] Patent Number: 4,504,604
[45] Date of Patent: Mar. 12, 1985

[54] ENERGY ABSORBING RUBBER COMPOSITION

[75] Inventors: Mervin V. Pilkington; Jack R. Creasey, both of Akron, Ohio; Richard H. Becken, Windsor, Vt.

[73] Assignee: The Goodyear Tire & Rubber Company, Akron, Ohio

[21] Appl. No.: 555,238

[22] Filed: Nov. 25, 1983

[51] Int. Cl.$^3$ .............................................. C09G 1/00
[52] U.S. Cl. ...................................... 523/167; 524/77; 524/518
[58] Field of Search ................... 523/167; 524/77, 518

[56] References Cited

U.S. PATENT DOCUMENTS

| | | | |
|---|---|---|---|
| 4,020,038 | 4/1977 | O'Mahoney, Jr. | 524/518 |
| 4,166,083 | 8/1979 | Ueda et al. | 524/518 |
| 4,200,579 | 4/1980 | Pennings et al. | 524/518 |
| 4,203,884 | 5/1980 | Coran et al. | 524/518 |
| 4,329,270 | 5/1982 | Meyer, Jr. et al. | 524/518 |
| 4,373,041 | 2/1983 | Wood et al. | 524/518 |
| 4,416,710 | 11/1983 | Anderson | 149/19.91 |

FOREIGN PATENT DOCUMENTS 58-13226  1/1983  Japan .................................. 524/518

*Primary Examiner*—Joseph L. Schofer
*Assistant Examiner*—N. Sarofim
*Attorney, Agent, or Firm*—Alvin T. Rockhill

[57] ABSTRACT

This invention discloses a rubber composition that has a high capacity for absorbing energy. This rubber composition has a Shore A hardness in the range of about 20 to about 30 and is nontoxic. Thus, it has excellent properties for use in articles that come in close proximity to humans or animals which benefit from the ability to absorb energy, such as shoe soles, gun butt pads, baseball glove insert pads, helmet liners, hammer handles, horse shoe pads, tumbling mats, and the like. The energy absorbing rubber composition of this invention comprises a mixture of a polynorbornene rubber, a plasticizer, and a resin which is incompatible with the polynorbornene.

33 Claims, No Drawings

4,504,604

ENERGY ABSORBING RUBBER COMPOSITION

TECHNICAL FIELD

This invention relates to an improved energy absorbing rubber composition that is useful as a structural material in a wide variety of articles. It is especially useful in shoe parts due to its light weight, its excellent ability to absorb energy, and its hardness which is in the range of about 20 to about 30. More particularly this improved rubber composition has a low specific gravity and unique load deflection characteristic. The shoe products made from this composition are comfortable and provide the wearer with protection from bonejaring shock which is the main cause of certain injuries, such as Achilles tendonitis and shin-splints.

BACKGROUND OF THE INVENTION

Elastomeric compositions which have been blown to give a microporous composition have been widely used in numerous products. For example, such elastomeric compositions are commonly used in shoe products, inner soles, sole insert pads, and heel pads which are preferably of the round cookie shape. Although these elastomeric products have been widely used in shoe inner soles and inner sole components, it has been appreciated that they needed to be improved in their shock absorbing ability. In recent years, a special polyurethane product has been promoted and sold which has a good ability to absorb shock and which has deflection characteristics similar to that of human flesh. This polyurethane product is not only extremely costly, but has a very high specific gravity, usually about 1.4, which results in shoes made from it being very heavy which is undesirable especially for runners and joggers.

SUMMARY OF THE INVENTION

The elastomeric compositions of this invention have a very desirable combination of properties for numerous applications as a structural material. These elastomeric compositions have the ability to absorb large amounts of kinetic energy and thus can be employed in a shock absorbing capacity. They have an ability to deform in response to impact and therefore upon contact with the human body they feel relatively comfortable. The elastomeric compositions of this invention are also nontoxic which permits them to be used in close proximity to human and animal bodies. This invention specifically discloses an elastomeric composition which comprises: (1) a polynorbornene rubber, (2) a plasticizer, and (3) a resin which is incompatible with the polynorbornene rubber.

Such elastomeric compositions are very valuable as a structural material for use in many articles of manufacture, such as, shoe soles, shoe inner soles, shoe heel pads, shoe sole insert pads, gun butt pads, horse shoe pads, baseball glove insert pads, tumbling mats, flack jacket liners, bulletproof vest liners, helmet liners, hammer handle grips, carpet underlay pads, floor mats, antivibration mats for sensitive instruments, and the like. Thus, this invention further reveals a nontoxic rubber article having excellent energy absorbing properties comprising: (1) a polynorbornene rubber, (2) a plasticizer, and (3) a resin which is incompatible with the polynorbornene rubber. Such nontoxic rubber articles normally contain from 20 to 400 parts of the plasticizer and from 5 to 120 parts of the resin which is incompatible with the polynorbornene rubber per 100 parts of the polynorbornene rubber (all parts are by weight). Generally, these rubber articles are cured with sulfur or peroxides at an elevated temperature in the presence of a cure activator.

DETAILED DESCRIPTION OF THE INVENTION

We have discovered that a polynorbornene based (non-polyurethane) elastomeric composition can be produced that has excellent energy absorbing properties, that feels good to touch, and that has a specific gravity of about 0.7 to about 1.2 (preferably a specific gravity of 1.0 to 1.15). Such polynorbornene based elastomeric compositions can be produced at an appreciably lower cost than can similar polyurethane compositions.

The polynorbornene based elastomeric compositions of this invention can be readily shaped, preferably by molding, for instance, by injection molding, compression molding, or transfer molding to form shock absorbing articles, such as, shoe inner sole pads, shoe heel pads and other shoe components. These elastomeric compositions are on a part by weight basis a blend of 100 parts of polynorbornene rubber, 20 to 400 parts of a plasticizer and from 5 to 120 parts of an incompatible resin (a resin which is incompatible with polynorbornene rubber). Such elastomeric compositions also can contain from 0 to about 100 phr (parts per hundred parts of rubber) of reinforcing or non-reinforcing fillers of mineral or carbon black type. Other additives can also be present in these elastomeric compositions in lesser amounts, such as, sulfur, zinc oxide, magnesium oxide, cure activators, accelerators, antioxidants, scorch inhibitors, and the like.

Optionally, these polynorbornene based elastomeric compositions can also contain up to about 50 parts per 100 parts of polynorbornene by weight of a second rubber. For example, an EPDM rubber can be added to improve the ozone and age resistance of the elastomeric composition. In fact, they can be used in lieu of staining antiozonants. EPDM rubbers are terpolymers of ethylene, propylene, and a diene monomer, such as, 1,3-butadiene. Some representative examples of EPDM rubbers that can be blended into the elastomeric compositions of this invention are described in U.S. Pat. No. 3,915,907 and U.S. Pat. No. 3,970,133 which are incorporated by reference herein. Nitrile rubbers can also be added to the elastomeric compositions of this invention in order to improve their oil resistance. Carboxylated nitrile rubbers can be added in order to improve the abrasion resistance of the elastomeric composition.

It is preferred for the elastomeric compositions of this invention to contain from 80 to 200 parts of the plasticizer and from 20 to 70 parts of an incompatible resin per 100 parts of polynorbornene rubber by weight. If it is desired to blend an EPDM into such an elastomeric composition then generally from 20 to 40 parts will be employed per 100 parts of polynorbornene rubber by weight.

The polynorbornene rubbers useful in this invention are readily available commercially. For example, CDF Chimie sells polynorbornene under the tradename Norsorex TM.

The plasticizers used in the practice of this invention are composed of light oils and an aromatic resin. It is important for these oils to be nontoxic to humans since they may come in contact with human skin. These oils are aromatic, naphthenic, and cyclic petroleum distillates which have been refined to eliminate polynuclear aromatic compounds and polar heterocyclic compounds. Hydrogenation can be employed in the refining process in order to remove certain of these undesired substances. The most important feature of these oils is their low polar content. Polars (polar heterocyclic compounds) are generally heterocyclic aromatics containing nitrogen, sulfur, or oxygen. Polar content can be measured by ASTM Method D2007. The oils employed in the plasticizers of this invention generally contain less than about 4 weight percent polar compounds (they have a polar content of less than about 4 weight percent). It is preferred for the oils used in the plasticizers of this invention to contain no more than 2 weight percent polar compounds. It is normally most preferred for these oils to have a polar content of 1 percent by weight or less. These oils also generally contain less than about 0.25 weight percent sulfur as determined by ASTM Method D2622. It is preferred for them to contain 0.1 weight percent sulfur or less.

The oils employed in the plasticizers of this invention have a high aromatic content and a low content of polynuclear aromatic compounds. These oils generally contain from about 20 to about 50 weight percent aromatic compounds as determined by ASTM Method D2007 and preferably contain from 30 to 45 weight percent aromatic compounds. Polynuclear aromatic compounds have a strong tendency to absorb ultraviolet light at a wave length of 260μ (milli-microns). Thus, as an oils content of polynuclear aromatics increases its absorptivity at 260μ will also increase. The oils used in the plasticizers of this invention will generally have an absorptivity at 260μ as determined by ASTM Method D2008 of about 8.0 or less, with absorptivities of less than 6.0 being preferred, and with absorptivities of 4.0 or less being most preferred.

The oils used in the plasticizers of this invention have molecular weights as determined by ASTM Method D2502 which normally range from about 200 to about 600 with molecular weights ranging from about 300 to about 450 being preferred. These oils generally have viscosities at 210° F. (99° C.) as determined by ASTM Method D2161 which range from about 20 to about 200 SUS (Saybolt Universal Seconds). Oil that has viscosities ranging from about 40 to about 125 SUS are normally preferred.

The aromatic resins employed in the plasticizers of this invention are prepared by the polymerization of aromatic monomers. These aromatic resins generally have a relatively low molecular weight ranging from about 200 to about 800. It is normally preferred for such aromatic resins to have a molecular weight of 300 to 500 with molecular weights of about 400 being most preferred. These aromatic resins can contain numerous aromatic rings, such as, benzene rings, naphthalene rings, anthracene rings, and the like.

Aromatic resins that are useful in the plasticizers of this invention can be synthesized by the polymerization of vinyl-substituted aromatic compounds. These vinyl-substituted aromatic compounds normally contain from 8 to 16 carbon atoms. Some representative examples of vinyl-substituted aromatic compounds include: styrene, alpha-methylstyrene, vinyl toluene, 3-methylstyrene, 4-methylstyrene, 4-cyclohexylstyrene, para-chlorostyrene, 3-vinyl-alpha-methylstyrene, 4-vinyl-alpha-methylstyrene, 1-vinyl naphthalene, 2-vinylnaphthalene, and the like. Terpenes can also be polymerized into aromatic resins that are useful as plasticizier components for use in the practice of this invention. For example, alpha-pinene can be polymerized into a polyterpene resin which has excellent properties for use as the aromatic resin in the plasticizers of this invention. Such polymerizations are normally initiated by employing free radical generators. Some free generators that can be used for this purpose include various peroxides, radiation, and ultraviolet light. The free radical generators that are most commonly used are benzoyl peroxide, dicumyl peroxide, t-butyl peroxybenzoate, and azodiisobutyronitrile.

Aromatic resins that can be employed in the plasticizers of this invention are readily available commercially. For example, Kenrich Petrochemicals, Inc. sells such an aromatic resin under the tradename Kenflex TM A. The Arizona Chemical Company also sells an aromatic resin which is a polyterpene under tradename Zonarex TM Alpha 25. Zonarez TM Alpha 25 has a molecular weight of about 400, a viscosity at 50° C. of 4300 cP (centipoise), and a ring and ball softening point of 25° C. Hercules Incorporated sells a polystyrene that can be employed as the aromatic resin in the plasticizers of this invention. It is sold under the tradename Piccolastic TM A and has a molecular weight that is in the range of 300 to 400.

The amount of oil and aromatic resin that can be incorporated in the plasticiziers of this invention can be varied over a wide range. However, it is generally preferred for the plasticizer to contain from about 5 to about 140 parts of aromatic resin per 100 parts of oil by weight. It is generally preferred for such plasticizers to contain from 20 to 80 parts of aromatic resin per 100 parts by weight of the oil. These plasticizers normally have a viscosity at 38° C. (100° F.) within the range of 4,000 to 10,000 SUS and have a pour point of 16° C. (60° F.) to 38° C. (100° F.). It is more preferable for them to have a pour point in the range of 24° C. (75° F.) to 35° C. (95° F.).

There are numerous resins which are incompatible with polynorbornene that can be employed in the rubber compositions of this invention. It should be noted that miscibility and compatibility mean essentially the same thing. The former refers generally to liquid systems, whereas the latter usually designates solid systems. In polymer-polymer systems which are compatible interdiffusion of the polymers results in the polymers being mixed homogeneously down to a molecular level, whereas in incompatible systems the minor component only breaks down into small domains. In most cases there is a lack of interfacial adhesion between such small domains of one polymer and the second polymer in incompatible systems (blends of incapatible polymers).

The compatibility of a given rubber-polymer blend can be determined by comparing the solubility parameters (δ) of the rubber and the polymer. As a rule of thumb if the difference between the solubility parameters of the rubber and polymer is equal to or greater than one then the rubber and polymer are incompatible. Thus, resins that have solubility parameters that differ from the solubility parameter of polynorbornene rubber by one or more are generally incompatible with the polynorbornene. A more detailed description of solubility parameters and the solubility parameter of numerous polymers is given by H. Burrell and B. Immergut, "Solubility Parameter Values," IV-341 in *Polymer Handbook*, J. Brandrup and H. Immergut, eds., Wiley-Interscience, New York, 1966, which is incorporated herein by reference. One incompatible resin that can be used with great success in the rubber compositions of this invention is sold under the tradename Staybelite TM and is a hydrogenated pine tar resin, having a saponification number of about 170 and a melting point of about 65° C. to 75° C.

After the elastomeric compositions of this invention have been molded into the desired shape they are cured at an elevated temperature generally in excess of 150° C. Normally sulfur is added to the elastomeric compositions of this invention as a curative in ordinary amounts ranging from about 0.5 to 5 phr with the amount of sulfur present preferably being in the range of 2 to 3 phr. It is advantageous to use cure activators, such as, zinc oxide, at a level of about 2 to 6 phr and preferably at a level of 4 to 5 phr. It is also advantageous to employ stearic acid at a level of 0.5 to 4 phr and preferably at a level of 1 to 2 phr in such elastomeric compositions. Well-known antioxidants and antiozonants can also be employed in cure recipes in normal levels generally ranging from 0.5 to 2 phr. A processing aid is also normally employed in elastomeric compositions in an amount ranging from 5 to 50 phr with 20 to 30 phr being preferred. Vulcanized vegetable oil is a preferred processing aid for use in such elastomeric compositions.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLE 1

This example has been included in order to illustrate the usefulness of the elastomeric compositions of this invention as a structural material from which innersoles for shoes can be made. 100 parts of polynorbornene rubber (Norsorex TM), 135 parts of Kenflex TM L (plasticizer), 25 parts of a vulcanized vegetable oil, and 40 parts of Staybelite TM (an incompatible resins) were mixed on a mill with about 5 parts of zinc oxide, 2 parts of stearic acid, 2.3 parts of sulfur, 4 parts of a sulfenamide, 0.8 parts of a methyl thiuram accelerator, and 1 part of an antioxidant to produce an elastomeric composition. This elastomeric composition was compression molded and cured at a temperature of about 150° C. for 30 minutes to produce an innersole for a shoe. This innersole exhibited excellent shock absorbing properties. This innersole compared very favorably to polyurethane innersoles commercially available in running and walking tests. The shoe manufactured using this innersole exhibited shock absorbing properties that were very beneficial to the wearer as well as being very compatible.

EXAMPLE 2

The elastomeric compositions of this invention have an excellent ability to dissipate energy. In other words, they provide a high degree of damping.

In this example, a Rheovibron (Model DDV-II), direct reading dynamic viscoelastometer, manufactured by Toyo Measuring Instruments Co., Ltd. was employed to determine the ability of the elastomeric composition specified in Example 1 to dissipate energy at various temperatures. The Rheovibron provides a direct reading of Tan $\delta$ which is essentially the materials damping ability or ability to absorb energy.

The elastomeric composition employed in the shoe innersole in Example 1 was tested on the Rheovibron over a temperature range from $-10°$ C. to 30° C. at a heating rate of 3° C. per minute at frequencies of 3.5 Hz, 11 Hz, and 110 Hz. The approximate Tan $\delta$ values of the elastomeric composition at various temperatures is given in Table I as determined at 3.5 Hz, 11 Hz, and 110 Hz.

TABLE I

| Temperature | Tan$\delta$ | | |
|---|---|---|---|
| | 3.5 Hz | 11 Hz | 110 Hz |
| $-10°$ C. (14° F.) | 0.1 | 0.1 | 0.1 |
| 0° C. (32° F.) | 0.8 | 0.6 | 0.2 |
| 10° C. (50° F.) | 1.8 | 1.8 | 1.2 |
| 20° C. (68° F.) | 0.8 | 1.0 | 1.8 |
| 30° C. (86° F.) | 0.2 | 0.3 | 1.0 |

As can be determined from Table I the elastomeric composition of this invention has high Tan $\delta$ values over a useful temperature range. In other words, it has an ability to dissipate large amounts of energy over the temperature range wherein shoes are normally used. Thus, it has a great capacity to absorb shock and acts as good protection for the foot in walking and especially in running.

EXAMPLE 3

This example is included in order to show that the elastomeric compositions of this invention compare very favorably in their ability to absorb energy with Sorbothane TM which is a polyurethane commonly used as a material for making innersoles for shoes. The procedure used in Example 2 was repeated in this example except that Sorbothane TM was used in place of the elastomeric composition of this invention tested in Example 2. Tan $\delta$ values are given in Table II.

TABLE II

| Temperature | Tan$\delta$ | | |
|---|---|---|---|
| | 3.5 Hz | 11 Hz | 110 Hz |
| $-10°$ C. (14° F.) | 0.9 | 0.9 | 1.2 |
| 0° C. (32° F.) | 0.8 | 0.8 | 1.0 |
| 10° C. (50° F.) | 0.7 | 0.7 | 0.9 |
| 20° C. (68° F.) | 0.6 | 0.7 | 0.8 |
| 30° C. (86° F.) | 0.5 | 0.7 | 0.8 |

As can be determined by comparing Table I with Table II the elastomeric compositions of this invention have a higher capacity to absorb energy at a temperature of 10° C. to 20° C. than does Sorbothane TM. This is every important since shoes are most commonly used in this temperature range.

While certain representative embodiments and details have been shown for the purpose of illustrating the invention, it will be apparent to those skilled in this art that various changes and modifications may be made therein without departing from the scope of the invention.

What is claimed is:

1. An elastomeric composition which comprises: (1) a polynorbornene rubber, (2) a plasticizer, and (3) a hydrogenated pine tar resin.

2. A composition as specified in claim 1 which is comprised of 20 to 400 parts of said plasticizer and 5 to 120 parts of said hydrogenated pine tar resin per 100 parts of said polynorbornene rubber.

3. A composition as specified in claim 2 which is comprised of 80 to 200 parts of said plasticizer and 20 to 70 parts of said hydrogenated pine tar resin per 100 parts of said polynorbornene rubber.

4. A composition as specified in claim 2 wherein said plasticizer is comprised of (a) an oil having a polar content of less than about 4 weight percent and an absorptivity at 260μ as determined by ASTM Method D2008 of about 8 or less and (b) an aromatic resin.

5. A composition as specified in claim 4 wherein said oil contains from about 20 to about 50 weight percent aromatic compounds.

6. A composition as specified in claim 4 wherein said oil contains no more than about 2 weight percent polar compounds.

7. A composition as specified in claim 6 wherein said oil contains no more than about 1 weight percent polar compounds.

8. A composition as specified in claim 4 wherein said oil has a molecular weight ranging from about 200 to about 600.

9. A composition as specified in claim 8 wherein said oil has a molecular weight ranging from about 300 to 450.

10. A composition as specified in claim 4 wherein said aromatic resin is a polymer of a vinyl-substituted aromatic compound containing from 8 to 16 carbon atoms and wherein said aromatic resin has a molecular weight of about 200 to about 800.

11. A composition as specified in claim 10 wherein said aromatic resin has a molecular weight ranging from 300 to 500.

12. A composition as specified in claim 4 wherein said aromatic resin is a polyterpene.

13. A composition as specified in claim 12 wherein said polyterpene has a molecular weight ranging from about 200 to about 800.

14. A composition as specified in claim 13 wherein said polyterpene has a molecular weight ranging from 300 to 500.

15. A composition as specified in claim 4 wherein said aromatic resin is polystyrene.

16. A composition as specified in claim 4 wherein said plasticizer is comprised of about 5 to about 140 parts of said aromatic resin per 100 parts of said oil by weight.

17. A composition as specified in claim 16 wherein said plasticizer is comprised of about 20 to about 80 parts of said aromatic resin per 100 parts of said oil by weight.

18. An article having excellent energy absorbing properties comprising a cured mixture of (1) a polynorbornene rubber, (2) a plasticizer, and (3) a hydrogenated pine tar resin.

19. An article as specified in claim 18 wherein said article is selected from the group consisting of shoe soles, shoe inner soles, shoe heel pads, shoe sole insert pads, gun butt pads, horse shoe pads, baseball glove insert pads, tumbling mats, flat jacket liners, bulletproof vest liners, helmet liners, hammer handle grips, carpet underlay pads, floor mats, and antivibration mats for sensitive instruments.

20. An article as specified in claim 19 which is comprised of 80 to 200 parts of said plasticizer and 20 to 70 parts of said hydrogenated pine tar resin per 100 parts of said polynorbornene rubber.

21. An article as specified in claim 20 wherein said plasticizer is comprised of (a) an oil having a polar content of less than about 4 weight percent and an absorptivity at 260μ as determined by ASTM Method D2008 of about 8 or less and (b) an aromatic resin.

22. An article as specified in claim 21 wherein said oil contains from about 20 to 50 weight percent aromatic compounds.

23. An article as specified in claim 22 wherein said oil contains no more than about 2 weight percent polar compounds and wherein said oil has a molecular weight ranging from about 200 to about 600.

24. An article as specified in claim 23 wherein said article is a shoe sole insert pad.

25. An elastomeric composition which comprises: (1) a polynorbornene rubber, (2) a plasticizer, and (3) a resin which is incompatible with the polynorbornene rubber which has a solubility parameter that differs from the solubility parameter of said polynorbornene rubber by at least one.

26. A composition as specified in claim 25 which is comprised of 20 to 400 parts of said plasticizer and 5 to 120 parts of said resin which is incompatible with the polynorbornene rubber per 100 parts by weight of said polynorbornene rubber.

27. A composition as specified in claim 26 which is comprised of 80 to 200 parts of said plasticizer and 20 to 70 parts of said resin which is incompatible with the polynorbornene rubber per 100 parts by weight of said polynorbornene rubber.

28. A composition as specified in claim 27 wherein said plasticizer is comprised of (a) an oil having a polar content of less than about 4 weight percent and an absorptivity at 260μ as determined by ASTM Method D2008 of about 8 or less and (b) an aromatic resin.

29. A composition as specified in claim 28 wherein said oil contains from about 20 to about 50 weight percent aromatic compounds, wherein said oil contains no more than about 2 weight percent polar compounds, and wherein said oil has a molecular weight ranging from about 200 to about 600.

30. A composition as specified in claim 29 wherein said plasticizer is comprised of about 20 to about 80 parts of said aromatic resin per 100 parts by weight of said oil.

31. A composition as specified in claim 30 wherein said aromatic resin is a polymer of a vinyl-substituted aromatic compound containing from 8 to 16 carbon atoms and wherein said aromatic resin has a molecular weight of about 200 to about 800.

32. A composition as specified in claim 30 wherein said aromatic resin is a polyterpene having a molecular weight ranging from about 200 to 800.

33. A composition as specified in claim 30 wherein said aromatic resin is polystyrene.

* * * * *